April 15, 1924.
J. H. ROSS
VALVE
Filed May 9, 1921
1,490,291
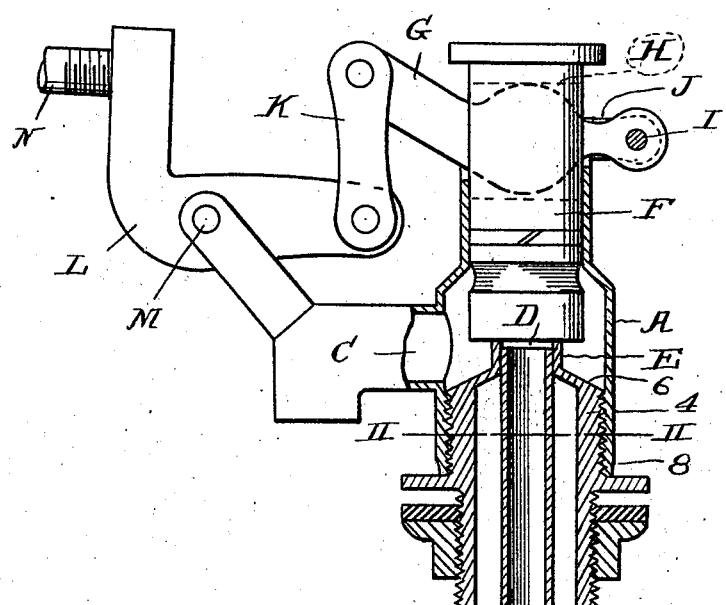
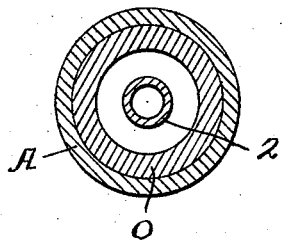
Witness:
Fred C. Fischer,
Inventor:
John H. Ross,
By F. G. Fischer,
Attorney.

Patented Apr. 15, 1924.

1,490,291

UNITED STATES PATENT OFFICE.

JOHN H. ROSS, OF KANSAS CITY, MISSOURI.

VALVE.

Application filed May 9, 1921. Serial No. 467,784.

*To all whom it may concern:*

Be it known that I, JOHN H. ROSS, a citizen of the United States, residing at Kansas City, in the county of Jackson and State of Missouri, have invented certain new and useful Improvements in Valves, of which the following is a specification.

This invention relates to new and useful improvements in valves and while susceptible to general use, is more particularly adapted to float valves used to control the flow of water into the flush tanks of water closets.

The principal object of the invention is to overcome the noise occasioned by the opening and closing of valves of this character which is due mainly to vibration and can usually be heard throughout the dwellings in which the valves are installed. I overcome the foregoing objection by providing the valve with a reduction tube and an air chamber, the former of which reduces the volume and the pressure of the water or other fluid passing through the valve, while the latter acts as a cushion in checking the inrush of water when the valve port is uncovered.

In order that a full understanding of the invention may be had, reference will now be made to the accompanying drawing, in which:

Fig. 1 is a side view partially in section of a valve embodying the invention.

Fig. 2 is a cross section on line II—II of Fig. 1.

Referring now in detail to the different parts, A designates the valve casing which has an inlet 8 and an outlet C between which a port D is located and surrounded by a valve seat E.

F designates a valve plunger for engaging the seat E for the purpose of closing the port D. Said plunger F may be actuated by any suitable mechanism. In the drawing, I have shown such mechanism consisting of a lever G extending through a slot H in the plunger and mounted at one end upon a pivot I, carried by a lug J projecting from the adjacent portion of the valve casing A. The opposite end of the lever G is connected to a link K, which in turn is connected to a bell-crank L fulcrumed at M and provided with a stem N upon which the usual float (not shown) is mounted.

The inlet end of the valve casing A is connected to a threaded tubular shank O provided with a coupling P, whereby it may be connected to a supply pipe (not shown).

The important features of the invention reside in a reduction tube 2 and an air chamber 4. As shown in Fig. 1, the reduction tube 2 is secured at one end within the valve seat E and extends through the greater portion of the shank O, while the air chamber 4 is arranged between said reduction tube 2 and the surrounding portion of the shank O. One end of the air chamber 4 is open to admit a portion of the fluid, but its opposite end is closed by the upper portion 6 of the shank O. The upper portion 6 of the shank O constitutes a partition which separates the air chamber 4 from the outlet C of the valve casing A.

In practice when the plunger F is unseated by downward movement of the stem N the inrush of water to the port D is checked by the reduction tube 2 and the air cushion 4, the former of which reduces the volume of the fluid in its flow to the port D, while the latter prevents the fluid from impinging against the partition 6 with a hammer-like blow, and thus vibration and the noise incident thereto is reduced to a minimum.

Having thus described my invention, what I claim and desire to secure by Letters Patent, is:

A valve of the character described consisting of a casing having an inlet and an outlet, a tubular shank adapted to be coupled to a supply pipe and connected at its upper end to the inlet end of said casing, said upper end being reduced to form a valve seat and a partition, a valve adapted to close said valve seat, mechanism for actuating said valve, and a reduction tube arranged in the shank and connected at its upper end to the partition at a point below the valve seat, said tube and shank forming an air chamber therebetween, and said partition separating said air chamber from the outlet of the casing, substantially as described.

In testimony whereof I affix my signature, in the presence of two witnesses.

JOHN H. ROSS.

Witnesses:
F. C. FISCHER,
L. J. FISCHER.